United States Patent Office 3,201,413
Patented Aug. 17, 1965

3,201,413
PHTHALOCYANINE DYES
Armand I. G. Henrard, Ghent, Belgium, and George Shulman, Teaneck, and Edward O. Klotz, Westwood, N.J., assignors to Pfister Chemical Works, Inc., Ridgefield, N.J., a corporation of New Jersey
No Drawing. Filed Mar. 6, 1961, Ser. No. 93,345
Claims priority, application Belgium, Mar. 7, 1960, 467,006; July 1, 1960, 470,736
3 Claims. (Cl. 260—314.5)

This invention relates to new dyestuffs and to the application of these products to various fibers to give a variety of colors.

One of the most difficult problems confronting the dyeing industry is to improve the wash fastness of dyes for many types of fibers. That is, dyes which are soluble and therefore can be handled by conventional methods, i.e., in solution, tend to be washed out of many fibers during laundering. On the other hand, if a material is insoluble, it cannot be readily handled and this may militate against its use as a dye, in spite of an attractive color.

It has been proposed to place solubilizing groups in insoluble pigments and thereby render them adaptable to solution dyeing techniques. One such group of pigments is the phthalocyanines, and a solubilizing group added thereto is the sulfonamide group (—$SO_2$—$NH_2$ or —$SO_2$—NHR) where R is an organic radical.

Copper phthalocyanine sulfonamides are blue dyestuffs which have good affinity for cotton and poor to viscose. However, their wash fastness is poor and they can only be used with a natural fiber such as cotton.

Copper phthalocyanines having up to four poly hydroxy sulfonamide groups, attached to the phenylene nuclei, of the general formula

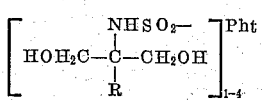

wherein R is a member selected from the group consisting of methyl, ethyl and $CH_2OH$ have been used for dyeing cotton. Such materials, however, are not suitable generally for dyeing other fibers, such as synthetics.

One object of the invention is to obtain a method and product for dyeing which will improve the wash fastness of the fabric, without requiring the use of organic solvents or other cumbersome procedures.

Another object of the invention is to utilize as dyes insoluble materials which heretofore have mainly been thought of only as pigments, such as the phthalocyanines.

Other objects and advantages will appear from the following description.

The term phthalocyanine is used herein in the generic sense to define tetraazoporphines in which each of the four pyrrole nuclei is fused to an aromatic nucleus, e.g. phenyl, biphenyl, naphthyl, anthranyl, etc. of which phthalocyanine itself (tetrabenzotetraazophorphin) is a well known example. The phthalocyanine molecule may be metal free or contain a metal in complex combination, e.g. copper, cobalt, nickel, iron, aluminum, etc.

The azo dyes may also be used in the invention. The azo dyes contain the common structural characteristic of the azo chromaphore (—N=N—) connecting two carbon systems, at least one of which is aromatic.

The term primary sulfonamide is used herein to designate the group

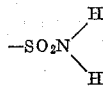

and the term secondary sulfonamide to designate the group

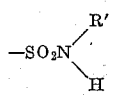

in which R' is an organic radical, or to designate mineral or organic salts of these groups, e.g.

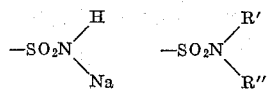

R" is the positive ion of an organic base.

Sulfonamides are known to react with aldehydes to give addition products, and under certain conditions these sulfonamide aldehyde addition products can be converted into thermofusible and thermosetting resins. A common example would be p-toluenesulfonamide and formaldehyde. The resins formed have much lower solubility in alkaline solution and organic solvents. However, this technology has never been applied effectively in the field of dyeing as in the present invention.

In accordance with the present invention, we prepare a sulfonamide derivative of the pigment and then form an addition product of such derivative with an aldehyde, such addition product having the characteristic linkage

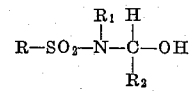

wherein R is the dye nucleus.

The group $R_1$ may be an aliphatic radical consisting essentially of a hydrocarbon, saturated or unsaturated, having up to about 20 carbon atoms, or an aromatic or aromaticaliphatic radical consisting essentially of hydrocarbon, saturated or unsaturated, having up to 15 carbon atoms; or a heterocyclic ring radical having a maximum of 12 carbon atoms, a maximum of 2 oxygen atoms and a maximum of 5 nitrogen atoms, and consisting essentially of carbon and a material of the group consisting of nitrogen and oxygen in the ring. Substituent groups may also be present in the radical $R_1$, for example, containing up to 3 oxygen atoms, such groups being limited essentially only in that they should not be so large as to render the addition product insoluble or, create steric hindrance problems, or have intrinsic catalytic properties toward condensation reactions, or react with aldehyde groups.

The aldehyde has the general formula $R_2$—CHO and therefore the group $R_2$ is found in the position shown in the formula for the addition product. $R_2$ may be an aliphatic radical consisting essentially of a hydrocarbon, saturated or unsaturated, having up to about 4 carbon atoms; or an aromatic or aliphatic-aromatic radical consisting essentially of a hydrocarbon, saturated or unsaturated, having up to 11 carbon atoms. Other substituent groups such as halogen (especially chlorine, fluorine or bromine), nitro(—$NO_2$), methoxy(—$OCH_3$) may also be present. Essentially, the only limitations in substituent groups is that they not be so large as to render the addition product insoluble or create steric hindrance problems.

Of course the radical $R_2$ may contain another aldehyde group (CHO) as in the case of glyoxal. In this instance, another grouping

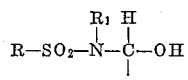

will generally form by the reaction of another molecule of the sulfonamide therewith.

The addition product is applied to the fiber under conditions which cause a condensation reaction to take place with the liberation of water. We believe that such condensation reaction is between the OH groups of the addition product on the one hand with active hydrogen atoms or other reactive groups on the fiber and/or other OH groups of the addition product on the other hand.

The copper phthalocyanine blue dyestuffs which are suitable for the dyeing of textiles through the formation of its aldehyde addition product have the following basic structure

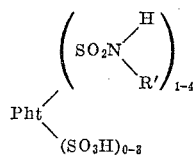

Pht represents the phthalocyanine molecule. R' represents a hydrogen or an organic radical. The acid ($SO_3H$) group or groups are usually present due to side reactions during the sulfonation process but they can be eliminated if proper precautions are taken. The primary effect of such groups is to increase the solubility of the compound. In some instances, i.e., when the group $R_1$ or $R_2$ is large, this may be desirable. On the other hand, excessive solubility caused by the presence of too many $SO_3H$ groups may impair the wash-fastness of the dyed fabric. Therefore, it is generally preferred that the number of sulfonamide groups per molecule be at least two and the number of $SO_3H$ groups be not more than two per molecule. The same principle applies to the other dyes as well.

The general formula for azo-sulfonamide compounds which can also be used, can be represented by the following formulas:

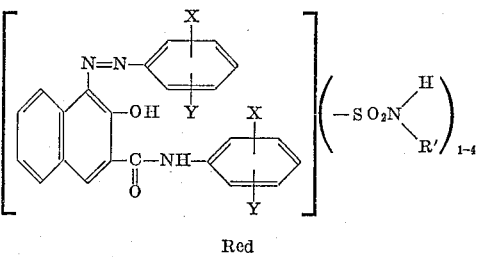

Red

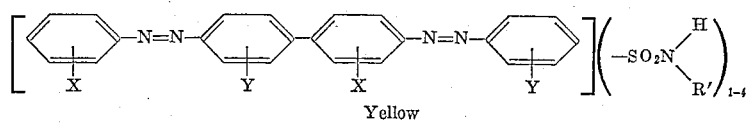

Yellow

Yellow

R' represents a hydrogen or an organic radical and X and Y are substituents common to azo dyes, e.g. hydrogen, halogens, nitro, methyl, methoxy groups, etc.

The new dyestuffs have the sulfonamide groups attached to the aromatic nucleus of the dyestuff with one of the hydrogen atoms of the sulfonamide group generally substituted with an organic radical. These addition products may be condensed with or without the use of copolymers which are discussed in greater detail hereinafter. The polymerization is initiated by the use of an acid or base catalyst and/or heat in accordance with known techniques.

The phthalocyanine and azo pigments are insoluble in aqueous solutions, but if one or more sulfonamide groups are added to the molecule the dyestuff becomes soluble in alkaline solutions. Formaldehyde, acetaldehyde, benzaldehyde, glyoxal and other aldehydes can then form addition products, after which they are applied to the fiber, and fixed on the fiber by the use of a catalyst or heat. In this manner increased wash fastness is obtained on various fibers.

The reaction can be carried out in the presence of co-monomers, e.g., methylolmelamine, methylolbenzoguanamine, dicyandiamide, biuret, etc., to form other copolymerization products. These co-monomers are known materials characterized by ability to undergo condensation reactions with the addition products discussed above and other alcohols thereby releasing water. They are generally heterocyclic nitrogen ring compounds containing 5 to 6 atoms in the ring, and at least one —C=N— linkage in the ring, such as the triazine compounds.

The textile material (1) can be treated in a dyeing bath together with the aldehyde, giving an addition product with the sulfonamide, or (2) can be first treated in an aqueous alkaline solution containing essentially the dyestuff followed by treatment with an aldehyde solution, or (3) can be first treated with the aldehyde and then subjected to the dyeing operation.

A condensaton accelerator may be incorporated such as an acid or a potentially acid substance (diethyl tartrate, phosphoric acid ester). An oxidizing agent, hydrogen peroxide or organic peroxides, may be used to convert the excess aldehyde into an acid. The textile material can also be passed through a bath containing an aldehyde and ions of an alkaline earth metal or an organic base to effect fixation of the dyestuff on the fiber. The dyestuffs contain one or more primary or secondary sulfonamide groups that contain at least one active hydrogen that may condense with aldehydes. The dyestuff may contain one or more solubilizing groups, e.g., $SO_3H$, $COOH$, etc.

Some of the condensation catalysts that have been successfully used are inorganic acids such as HCl, $H_2SO_4$; organic acids such as formic acid, acetic acid, benzoic acid, tartaric acid; acid producing substances such as diethyl tartarate, esters of phosphoric acid; alkali metal hydroxides such as sodium or potassium hydroxide, diethanolamine, triethanolamine, barium hydroxide. Other known condensation catalysts may be utilized, however.

Following is a description of the general method for preparing azo pigments.

STEP I.—DIAZO

In a one liter beaker, place 0.05 gm.-mol of amine with 150 cc. 10% HCl, and warm to dissolve if necessary. Where herein indicated, 10% solutions are on a volume/volume or weight/volume basis. For example, 10% hydrochloric acid is 10 cc. of concentrated hydrochloric acid made up to 100 cc. with water. 10% sodium nitrate is 10 gms. of dry sodium nitrate made up to 100 cc. final volume. Add ice to bring temperature to 0° C. The mixture is vigorously stirred and 40 cc. of a 10% solution of sodium nitrate is added. After ½ hour, 20 cc. of a 10% solution of sulfamic acid is added to remove excess nitrous acid. Two (2) grams of charcoal is added and the mixture allowed to continue stirring for an additional 10 minutes. The charcoal is removed by filtration of the solution with suction through a 7½ cm. Büchner funnel. A solution of 100 cc. of 10% sodium acetate is then added to buffer the diazo solution.

STEP II.—COUPLING AGENT

In a 2 liter beaker, place 0.05 gm.-mol of the developer and 500 cc. water. Heat to the boil with agitation and add 50 cc. of 10% sodium hydroxide solution. After solution is complete, and 20 g. filter aid and 2 gm. charcoal and filter through an 11 cm. Büchner funnel. The pressed cake is washed with 100 cc. of hot water and the filtrate placed in a 4-liter beaker and cooled to 20° C. The volume is then made up to one liter with cold water. With good agitation, the naphthol is precipitated in a finely divided state by the addition of 100 cc. of a 10% acetic acid solution.

STEP III.—PIGMENT FORMATION

The developer suspension is agitated and the diazo added at once. The temperature of the mixture at this point is about 20° C. and the pH is 5. The rate of coupling is tested for by spotting with H-acid. The mixture is stirred for ½ hour and then slowly, over 1 hour, heated on a gas hot plate with continuous agitation to the boil. Maintain this temperature for 15 minutes, then allow to cool to about 80°. The pigment is collected on a 19 cm. Büchner funnel and washed well with hot water. It is then sucked dry as possible, and dried at 40–50° C.

The following examples are presented to illustrate the invention, and not in a limiting sense. The parts expressed are by weight unless otherwise indicated.

Dyestuffs of the azo types containing the substituted sulfonamide groups that have been used in dyeing various fibers are represented by the following general formula:

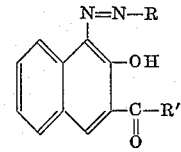

wherein R and R' have the following structure:

| Example No. | R | R' |
|---|---|---|
| 1 | $H_3CO$—C$_6$H$_4$—$SO_2$—NH—naphthyl | $H_3CO$—C$_6$H$_3$(NH$_2$)—$SO_2$—NH—naphthyl |
| 2 | $H_3CO$—C$_6$H$_4$—$SO_2$—$NH_2$ | $H_3CO$—C$_6$H$_3$(NH$_2$)—$SO_2$—$NH_2$ |
| 3 | $H_3CO$—C$_6$H$_4$—$SO_2$—$NH_2$ | $H_3CO$—C$_6$H$_3$(NH$_2$)—$SO_2$—NH—C$_6$H$_5$ |
| 4 | $H_3CO$—C$_6$H$_4$—$SO_2$—$NH_2$ | —NH—C$_6$H$_2$($OCH_3$)($OCH_3$)(Cl) |
| 5 | $H_3CO$—C$_6$H$_4$—$SO_2$—NH—naphthyl | $H_3CO$—C$_6$H$_3$(NH$_2$)—$SO_2$—NH—C$_6$H$_5$ |

| Example No. | R | R' |
|---|---|---|
| 6 | 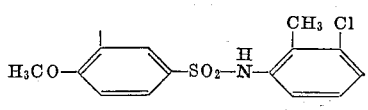 | 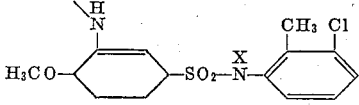 |
| 7 | 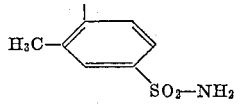 | 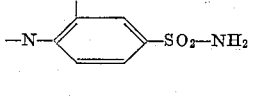 |
| 8 | 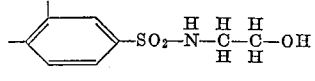 | 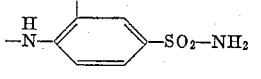 |
| 9 | 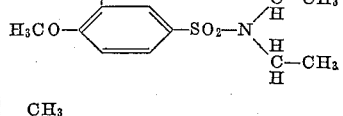 | 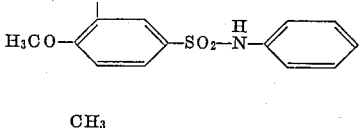 |
| 10 | 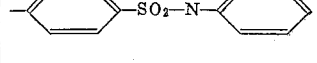 | 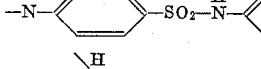 |
| 11 | 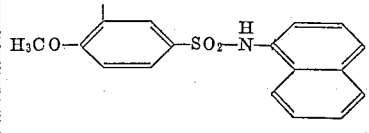 | 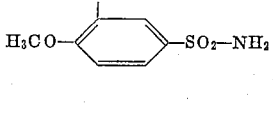 |
| 12 | 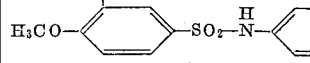 | 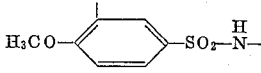 |
| 13 | 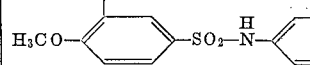 | 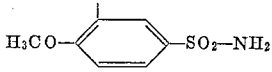 |
| 14 | 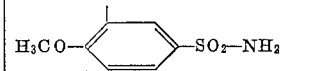 | 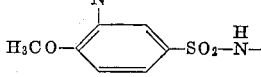 |
| 15 |  | 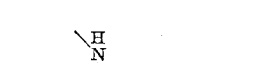 |
| 16 | 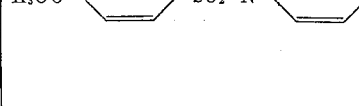 | 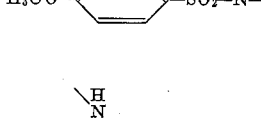 |
| 17 | 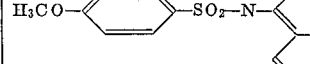 | 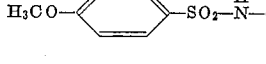 |
Another group of azo dyes that have been used are represented by the general formula:
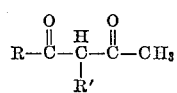

wherein R and R' have the following structure:

| Example No. | R | R' |
|---|---|---|
| 18 | −NH−C₆H₄−SO₂−NH₂ | −N=N−C₆H₄(NO₂) |
| 19 | −NH−C₆H₄−SO₂−NH₂ | −N=N−C₆H₃(NO₂)−SO₂NH₂ |
| 20 | −NH−C₆H₄−SO₂−NH−C₆H₅ | −N=N−C₆H₃(NO₂)−SO₂−NH−C₆H₅ |
| 21 | −NH−C₆H₄−SO₂−NH−C₆H₅ | −N=N−C₆H₄(NO₂) |

| Example No. | Structure |
|---|---|
| 22 | H₃C−CO−CH(−N=N−C₆H₃(Cl)−C₆H₃(Cl)−N=N−CH(−CO−CH₃)−CO−NH−C₆H₄−SO₂−NH₂)−CO−NH−C₆H₄−SO₂−NH₂ |
| 23 | H₃C−CO−CH(−N=N−C₆H₃(Cl)−C₆H₂(SO₂NH₂)−C₆H₂(SO₂NH₂)−C₆H₃(Cl)−N=N−CH(−CO−CH₃)−CO−NH−C₆H₅)−CO−NH−C₆H₅ |
| 24 | (H₂N−SO₂−C₆H₃(OCH₃)−N=N−CH(−CO−CH₃)−CO−NH−C₆H₃(CH₃)−)₂ (biphenyl linked) |

The following examples illustrate the use of copper phthalocyanine dyestuffs of the general formula:

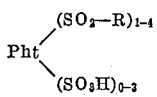

wherein Pht=copper phthalocyanine

| Example No. | R |
|---|---|
| 25 | NH(C₁₇H₃₅) |
| 26 | [ –N(H)–⟨C₆H₄⟩–SO₃H ] |
| 27 | [ –N(H)–⟨C₆H₅⟩ ] |
| 28 | [naphthyl–NH–] |
| 29 | [ –N(H)–⟨C₆H₃(CH₃)⟩–Cl ] |
| 30 | [–NH₂] |

The invention is further illustrated by the following specific examples to which, however, it is not intended that it be limited. Parts are by weight unless otherwise noted.

*Example 31*

Two (2) parts copper phthalocyanine trisulfonamide monosulfonic acid (prepared by reacting copper phthalocyanine, chlorosulfonic acid and phosphorous pentachloride followed by treatment with ammonia) are dissolved in 20 parts dimethylformamide at 80° C. and 150 parts water, 1 part caustic soda and 15 parts monoethanolamine are added.

The fibers are padded through this solution and are dried at a temperature below 100° C.

The fibers are dyed a bright reddish-blue with poor washfastness on Orlon, acetate, cotton, nylon, silk and rayon, for the reason that no aldehyde was used. This example illustrates the results obtained when the invention is not followed.

*Example 32*

To the padding solution prepared as described in Example 31, 1 part (by volume) of benzaldehyde is added.

Following the above dyeing procedure a bright blue dyeing is obtained with good washfastness on Orlon, acetate, nylon, silk, rayon and fairly good for cotton.

*Example 33*

A solution is made of 2 parts phthalocyanine trisulfonanilide monosulfonic acid (prepared from copper phthalocyanine tetrasulfonylchloride and aniline), 99 parts water, and 1 part caustic soda. The fibers are padded through this solution and dried at 60–70° C.

A blue greenish dyeing is obtained which gives fair washfastness on Dacron, acetate and silk.

*Example 34*

The dyeing solution is prepared as in Example 33 and 15 parts formaldehyde (30%) is added at 80° C. and held at this temperature for 30 minutes. The fibers are padded through this solution and are dried at 60–70° C. The fibers are dyed a bright blue-green with good fastness to washing on Dacron, acetate, nylon and silk and fairly good for cotton and rayon. If the fibers are now heated above 100° C., for instance, 3 minutes at 145°, or 10 minutes at 130–140° the fastness is increased on all fibers.

*Example 35*

Proceed as in Example 34, but replace the 15 parts of formaldehyde (30%) by 1 part benzaldehyde. After heating above 100° C. the washfastness is excellent on all the fibers (Dacron, acetate, nylon, silk, cotton, rayon and glass).

*Example 36*

A solution is made of 2 parts phthalocyanine trisulfonanilide monosulfonic acid, 99 parts water, and 1 part caustic soda.

The fibers are padded through this solution, dried at 60–70° C., and padded again through a solution composed of 5 parts formic acid, 1.6 parts glyoxal (30%) and 100 parts water.

The fibers are again dried at 60–70° C. and then heated at 140° for 8 minutes.

A dyeing with excellent washfastness is obtained on Dacron and acetate, very good for nylon, silk and rayon, and good for cotton.

*Example 37*

In the preceding examples the water was substituted by a printing thickener. After printing the same procedure was followed as in the above examples with similar results.

*Example 38*

A solution is prepared from 2 parts copper phthalocyanine trisulfonanilide monosulfonic acid (prepared from phthalic monosulfonic acid), 100 parts water and 1 part caustic soda.

The fibers are padded through this solution and then passed through a solution containing 100 parts water, 2 parts barium hydroxide and 2 parts glyoxal 30%.

The fibers are then dried at 100° C.

Bright blue-green dyeings with very good washfastness for Dacron, acetate, nylon, silk, rayon, wool, and good for cotton are obtained.

*Example 39*

Solution A is prepared from the following components: 62.5 parts sodium bisulfite, 210 parts water heated to 60° C. and 97 parts glyoxal (30%).

Solution B is prepared from: 8 parts of solution A and 42 parts water.

The fibers are padded through solution B and dried at 60–70° C.

The fibers are passed through a dyestuff solution containing 2 parts copper phthalocyanine trisulfonanilide monosulfonic acid, 1 part caustic soda and 47 parts water, dried at 60–70° C. and heated above 100° C. for 10 minutes.

Dyeing with excellent washfastness is obtained on cotton, wool, silk, nylon, acetate and Orlon.

*Example 40*

Examples 31 to 38 are repeated on the azo pigments giving washfastness properties similar to that obtained on the phthalocyanine dyestuffs.

*Example 41*

The following solution is prepared: 2 parts yellow azo pigment (prepared by coupling o-nitroanilinesulfonamide and acetoacetsulfanilamide), 46 parts water, 0.5 part soda ash, 0.5 part copper phthalocyanine trisulfonanilide monosulfonic acid and 1 part benzaldehyde.

The fibers are padded through this solution and are dried at 60–70° C., then heated at 140–145° C. for 5 minutes.

A bright green shade is obtained with very good washfastness on Dacron, acetate, nylon, silk, cotton and rayon.

Example 42

The following solution is prepared: 2 parts copper phthalocyanine trisulfonanilide monosulfonic acid, 1 part soda ash, 2 parts benzaldehyde, 20 parts methylolmelamine (having at least 2 methylol groups per molecule) solution and 25 parts water.

The dye solution is padded on the fiber at 60–80° C., then dried at 60° C. The fiber is exposed to temperatures 140–145° C. for 10 minutes.

The textile material is dyed a bright blue with excellent washfastness on all fibers.

In the preceding discussion and in the examples, the phthalocyanine and the azo dyes are illustrated. However, the invention may be applied to other dyes which contain an aromatic ring that can be substituted with at least one sulfonamide group of the character described above. The sulfonamide-substituted dye is then reacted with the aldehyde in a similar manner and the fiber is treated with the resulting addition product under conditions which produce a condensation reaction.

In discussing the theory of the invention above, it was suggested that the condensation reaction might be between molecules of the addition product and active hydrogen atoms in the fibers. However, it is believed that there may also be encasement of the fibers by the condensation polymers formed, and this may account for the substantially improved washfastness properties, particularly in the case of fibers which are believed to have no active hydrogens, such as polypropylene and glass fibers.

We claim:

1. The compound having the following structure

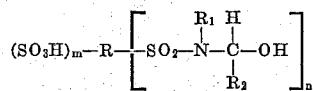

wherein R is an unsubstituted phthalocyanine radical and said —SO$_2$ is linked directly to an aromatic ring of said dye, R$_1$ is a member of the group consisting of phenyl and naphthyl, R$_2$ is a radical of the class consisting of hydrogen, CH$_3$—, and another radical

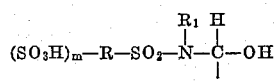

$n$ is an integer from 1 to 4, and $m$ is an integer from 0 to 2.

2. The compound described in claim 1 in which R$_1$ is phenyl and R$_2$ is phenyl.

3. The compound described in claim 1 in which the group R$_1$ is phenyl and the group R$_2$ is

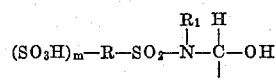

References Cited by the Examiner

UNITED STATES PATENTS

| | | | |
|---|---|---|---|
| 2,154,837 | 4/39 | Fischer | 260—203 |
| 2,252,844 | 8/41 | Fischer et al. | 260—204 |
| 2,339,739 | 1/44 | Blackshaw | 8—54.2 |
| 2,741,534 | 4/56 | Pederson | 8—54.2 |
| 2,752,333 | 6/56 | Lecher | 260—152 |
| 2,754,293 | 7/56 | Brody | 260—152 |
| 2,879,268 | 3/59 | Jullander | 260—209 X |
| 3,009,920 | 11/61 | Jaeger et al. | 260—314.5 |
| 3,042,683 | 7/62 | Howard et al. | 260—314.5 |
| 3,063,780 | 11/62 | Rosch et al. | 260—314.5 |

FOREIGN PATENTS

| | | |
|---|---|---|
| 548,053 | 10/57 | Canada. |
| 1,079,756 | 4/60 | Germany. |
| 826,689 | 1/60 | Great Britain. |

OTHER REFERENCES

Hickenbottom: Reactions of Organic Compounds, 2nd edition (1948), pp. 158–160.

Lubs: Chemistry of Synthetic Dyes and Pigments, p. 583, pub. 1955 by Reinhold Pub. Corp., New York City.

WALTER A. MODANCE, *Primary Examiner.*

MORRIS O. WOLK, IRVING MARCUS, CHARLES B. PARKER, *Examiners.*